US011206485B2

United States Patent
Stamenovic et al.

(10) Patent No.: US 11,206,485 B2
(45) Date of Patent: Dec. 21, 2021

(54) AUDIO PROCESSING USING DISTRIBUTED MACHINE LEARNING MODEL

(71) Applicant: Bose Corporation, Framingham, MA (US)

(72) Inventors: Marko Stamenovic, Jamaica Plain, MA (US); Li-Chia Yang, Waltham, MA (US); Carl Ralph Jensen, Waltham, MA (US); Kenneth Scott Lyons, Bellingham, MA (US); Sara Maree Adkins, Somerville, MA (US); Jahn Dmitri Eichfeld, Natick, MA (US); Daniel Ross Tengelsen, Framingham, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 16/818,074

(22) Filed: Mar. 13, 2020

(65) Prior Publication Data

US 2021/0289296 A1 Sep. 16, 2021

(51) Int. Cl.
  *H04R 3/04* (2006.01)
  *G10L 21/0232* (2013.01)
  *H04R 5/033* (2006.01)
  *H04R 5/04* (2006.01)
  *G10L 21/0216* (2013.01)
  *G10L 21/0208* (2013.01)

(52) U.S. Cl.
  CPC ............ *H04R 3/04* (2013.01); *G10L 21/0232* (2013.01); *H04R 5/033* (2013.01); *H04R 5/04* (2013.01); *G10L 21/0208* (2013.01); *G10L 2021/02163* (2013.01); *H04R 2420/07* (2013.01)

(58) Field of Classification Search
  CPC ............... G10L 21/0208; G10L 21/02; G10K 2210/1081; G10K 2210/1282; G10K 2210/128; G10K 2210/1281
  USPC .......... 381/94.1–94.8, 71.6, 71.7, 56, 92, 98
  See application file for complete search history.

(56) References Cited

U.S. PATENT DOCUMENTS

| | | | |
|---|---|---|---|
| 9,363,255 B2 * | 6/2016 | Coburn, IV | ......... H04N 21/658 |
| 10,194,259 B1 | 1/2019 | Martin et al. | |
| 10,535,362 B2 | 1/2020 | Bryan et al. | |

(Continued)

FOREIGN PATENT DOCUMENTS

EP     1640972 A1    3/2006

OTHER PUBLICATIONS

PCT International Search Report and Written Opinion for International Application No. PCT/US2021/020792, dated Aug. 18, 2021, 17 pages.

(Continued)

*Primary Examiner* — Disler Paul
(74) *Attorney, Agent, or Firm* — Hoffman Warnick LLC (57) ABSTRACT

Various implementations include systems for processing audio signals. In particular implementations, a system for processing audio signals includes: a wearable audio device having a transducer and a communication system; and an accessory device configured to wirelessly communicate with the wearable audio device, the accessory device having a processor configured to process a source audio signal according to a method that includes: source separating the source audio signal; and providing a source separated audio signal to the wearable audio device for transduction.

13 Claims, 5 Drawing Sheets

(56) References Cited

U.S. PATENT DOCUMENTS

| | | | |
|---|---|---|---|
| 2015/0243272 A1* | 8/2015 | Ozluturk | G10K 11/17827 381/71.6 |
| 2018/0040327 A1 | 2/2018 | Ono et al. | |
| 2019/0166435 A1* | 5/2019 | Crow | H04R 25/505 |
| 2019/0394339 A1* | 12/2019 | Seo | G10L 21/0272 |
| 2020/0160878 A1* | 5/2020 | Heo | G10L 25/51 |
| 2020/0241834 A1* | 7/2020 | Boeen | G10L 25/51 |
| 2020/0279553 A1* | 9/2020 | McDuff | G10L 15/22 |

OTHER PUBLICATIONS

Heymann Jahn et al., "BLSTM supported GEV beamformer front-end for the 3rd Chime Challenge," 2015, IEEE Workshop on Automatic Speech Recognition and Understanding, Dec. 13, 2015, pp. 444-451.

Heymann Jahn et al., "A generic neural acoustic beamforming architecture for robust multi-channel speech processing," Computer Speech and Language, Elsevier, London, GB, vol. 46, 28, pp. 374-385.

Boeddeker Christoph et al., "Optimizing neural-network supported acoustic beamforming by algorithmic differentiation," 2017, IEEE International Conference on Acoustics, Speech and Signal Processing, Mar. 5, 2017, pp. 171-175.

* cited by examiner

AUDIO PROCESSING USING DISTRIBUTED MACHINE LEARNING MODEL

TECHNICAL FIELD

This disclosure generally relates to wearable audio devices. More particularly, the disclosure relates to reducing noise in wearable audio devices using a distributed machine learning model.

BACKGROUND

Wearable audio devices, such as headphones, earphones and other physical configurations, are utilized for various purposes. In some instances, wearable audio devices include one or more technologies for eliminating unwanted noise. For example, many wearable audio devices include active noise reduction (ANR) for countering unwanted environmental noise with the generation of anti-noise signals. However, noise reduction systems can require significant processing resources and can consume significant power resources.

SUMMARY

All examples and features mentioned below can be combined in any technically possible way.

Systems are disclosed that enable noise reduction in playback at audio devices. Some implementations include systems for reducing noise to improve intelligibility of a targeted audio signal, such as speech. In particular implementations, a system for processing audio signals includes: a wearable audio device having a transducer and a communication system; and an accessory device configured to wirelessly communicate with the wearable audio device, the accessory device having a processor configured to process a source audio signal according to a method that includes: separating the source audio signal into its constituent components (for example noisy speech separates to speech and noise); and providing the separated audio signals of interest (for example only speech) to the wearable audio device for transduction.

In additional particular implementations, a system for processing audio signals includes: a wearable audio device including a communication system, a transducer and a first processor, where the first processor includes an onboard machine learning model configured to process a source audio signal and generate a first source separated audio signal; an accessory device configured to wirelessly communicate with the wearable audio device, where the accessory device comprises a second processor having a remote machine learning module configured to process the source audio signal and generate a second source separated signal; and a supervisory process configured to selectively output the first source separated audio signal or the second source separated audio signal to the transducer.

In further particular implementations, a system for processing audio signals includes: an accessory device that includes a first processor for running a machine learning model on an input signal, where the machine learning model comprises a classifier configured to generate metadata associated with the input signal; and a wearable audio device configured for wireless communication with the accessory device, where the wearable audio device comprises a second processor that utilizes the metadata from the accessory device to process a source audio signal and output a processed audio signal.

Implementations may include one of the following features, or any combination thereof.

In some cases, source separating the source audio signal includes: converting the source audio signal into a first sequence of frequency transformed frames, each having a first frame size; converting the source audio signal into a second sequence of frequency transformed frames, each having a second frame size greater than the first frame size; applying a machine learning model to the second sequence of frequency transformed frames to create a spectral mask; applying the spectral mask to the first sequence of frequency transformed frames to generate a source separated sequence of frequency transformed frames of the first frame size; converting the source separated sequence of frequency transformed frames to a source separated time domain signal; where providing the source separated audio signal to the wearable audio device includes wirelessly transmitting the source separated time domain signal to the wearable audio device.

In certain aspects, converting the source audio signal into the first sequence of frequency transformed frames includes applying a window function to the source audio signal to generate frames of the first frame size and then applying a fast Fourier transform (FFT) to the frames.

In particular implementations, converting the source audio signal into the second sequence of frequency transformed frames includes applying a window function to the source audio signal to generate frames of the second frame size and then applying a fast Fourier transform (FFT) to the frames.

In some cases, converting the source audio signal into the second sequence of frequency transformed frames further includes: taking an absolute value of data in each frame after the FFT is applied; applying a spectral transform (for example a Mel filterbank) to the data in each frame.

In certain aspects, creating the spectral mask further includes performing an inverse spectral transform after the machine learning model is applied.

In some implementations, applying the spectral mask to the first sequence of frequency transformed frames includes performing a pointwise multiply operation, and converting the source separated sequence of frequency transformed frames to the source separated time domain signal includes: performing an inverse FFT on an output of the pointwise multiply operation; and performing an inverse window function on an output of the inverse FFT.

In particular cases, the remote machine learning model operates with a higher latency than the onboard machine learning model.

In certain aspects, the supervisory process utilizes the first source separated audio signal in response to a determination that the wearable audio device cannot communicate with the accessory device.

In some implementations, the supervisory process utilizes the second source separated audio signal in response to a determination that the earpiece has a low battery condition.

In particular aspects, both the wearable audio device and accessory device have a microphone configured to capture the source audio signal.

In certain cases, the system further includes a second supervisory process that combines the remote machine learning model and the onboard machine learning model to form an ensemble model, where an output of the remote machine learning model is passed as input to the onboard machine learning model.

In some implementations, at least one of the onboard machine learning model and remote machine learning model performs beamforming.

In certain aspects, the metadata identifies an environment within which the source audio signal is captured.

In particular cases, the environment includes at least one of: an airplane, an outdoor space, an indoor space, a vehicle, a quiet space, or an entertainment venue.

In some aspects, the metadata includes an identity of a person speaking to a user of the wearable audio device.

In certain implementations, the metadata determines whether the person speaking is a user of the wearable audio device.

In particular aspects, the wearable audio device includes a selectable set of machine learning models that are selected in response to the metadata generated by the accessory device.

Two or more features described in this disclosure, including those described in this summary section, may be combined to form implementations not specifically described herein.

The details of one or more implementations are set forth in the accompanying drawings and the description below. Other features, objects and benefits will be apparent from the description and drawings, and from the claims

It is noted that the drawings of the various implementations are not necessarily to scale. The drawings are intended to depict only typical aspects of the disclosure, and therefore should not be considered as limiting the scope of the implementations. In the drawings, like numbering represents like elements between the drawings.

DETAILED DESCRIPTION

Various implementations describe distributed machine learning-based systems that include a wearable audio device and an accessory device. In certain implementations, the distributed machine learning-based systems source separate audio sources, which may include noise reduction, de-noising, separating audio information, etc., to enhance the performance or intended function of the wearable device. In particular implementations, the distributed machine learning-based systems enable efficient data processing, power management and/or form factors for wearable audio devices.

The solutions disclosed herein are intended to be applicable to a wide variety of wearable audio devices, i.e., devices that are structured to be at least partly worn by a user in the vicinity of at least one of the user's ears to provide audio for at least that one ear. It should be noted that although various specific implementations of wearable audio devices may include headphones, two-way communications headsets, earphones, earbuds, hearing aids, audio eyeglasses, wireless headsets (also known as "earsets") and ear protectors, presentation of specific implementations are intended to facilitate understanding through the use of examples, and should not be taken as limiting either the scope of disclosure or the scope of claim coverage.

Additionally, the solutions disclosed herein are applicable to wearable audio devices that provide two-way audio communications, one-way audio communications (i.e., acoustic output of audio electronically provided by another device), or no communications, at all. Further, what is disclosed herein is applicable to wearable audio devices that are wirelessly connected to other devices, that are connected to other devices through electrically and/or optically conductive cabling, or that are not connected to any other device, at all. These teachings are applicable to wearable audio devices having physical configurations structured to be worn in the vicinity of either one or both ears of a user, including and not limited to, headphones with either one or two earpieces, over-the-head headphones, behind-the neck headphones, headsets with communications microphones (e.g., boom microphones), in-the-ear or behind-the-ear hearing aids, wireless headsets (i.e., earsets), audio eyeglasses, single earphones or pairs of earphones, as well as hats, helmets, clothing or any other physical configuration incorporating one or two earpieces to enable audio communications and/or ear protection.

Beyond wearable audio devices, what is disclosed and claimed herein is also meant to be applicable to the provision of noise reduction in relatively small spaces in which a person may sit or stand, including and not limited to, phone booths, vehicle passenger cabins, etc.

In various implementations, the wearable audio devices described herein may incorporate active noise reduction (ANR) functionality that may include either or both feedback-based ANR and feedforward-based ANR, in addition to possibly further providing pass-through audio and audio processed through typical hearing aid signal processing such as dynamic range compression.

Additionally, the solutions disclosed herein are intended to be applicable to a wide variety of accessory devices, i.e., devices that can communicate with a wearable audio device and assist in the processing of audio signals. Illustrative accessory devices include smartphones, Internet of Things (IoT) devices, computing devices, specialized electronics, vehicles, computerized agents, carrying cases, charging cases, smart watches, other wearable devices, etc.

In various implementations, the wearable audio device and accessory device communicate wirelessly, e.g., using Bluetooth, or other wireless protocols. In certain implementations, the wearable audio device and accessory device reside within several meters of each other.

Various implementations detailed herein are described referencing de-noise systems and/or de-noised signals. However it is understood that the solutions provided herein can apply to any type of source separation system, including, e.g., noise reduction, separating audio, separating different speakers out of a mixture, separating sounds such as emergency vehicles, alarms, etc.

Figure 1:
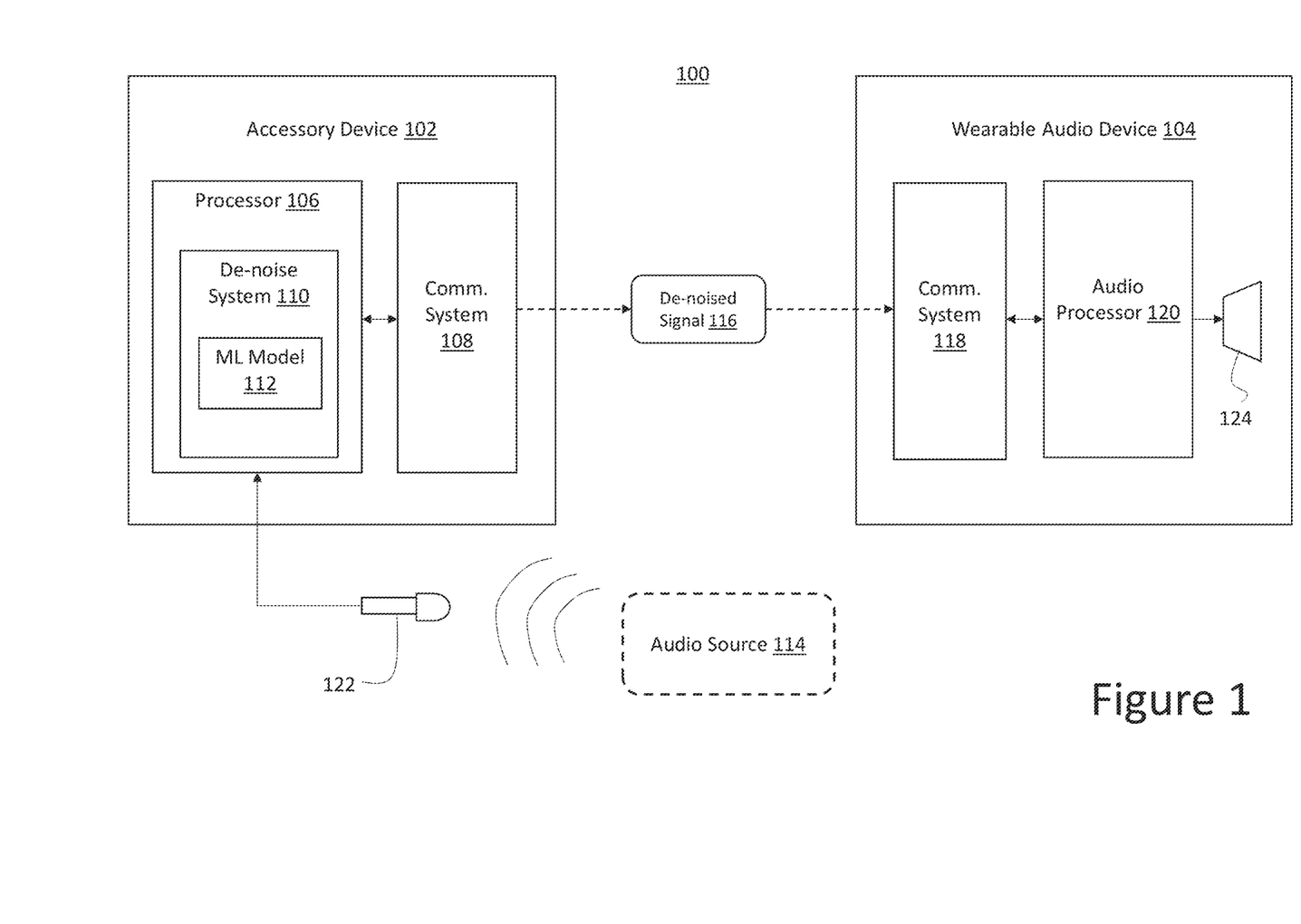
FIG. 1 depicts a block diagram of a distributed machine learning-based system having a wearable audio device and an accessory device according to various implementations.

FIG. 1 is a block diagram of an illustrative distributed machine learning-based system 100 that includes an accessory device 102 and a wearable audio device 104. As noted, the wearable audio device 104 may be structured to be worn by a user to provide an audio output to a vicinity of at least one of the user's ears. The wearable audio device 104 may have any of a number of form factors, including configurations that incorporate a single earpiece to provide audio to only one of the user's ears, others that incorporate a pair of earpieces to provide audio to both of the user's ears, and others that incorporate one or more standalone speakers to provide audio to the environment around the user. However, it should be noted that for the sake of simplicity of discussion, only a single device 104 is depicted and described in relation to the implementations described in FIGS. 1-3. Example wearable audio devices are illustrated and described in further detail in U.S. Pat. No. 10,194,259 (Directional Audio Selection, filed on Feb. 28, 2018), which is hereby incorporated by reference in its entirety.

In the illustrative implementation of FIG. 1, accessory device 102 includes a processor 106 configured to process audio signals and a communication (comm.) system 108 configured to communicate with the wearable audio device 104. In this implementation, processor 106 processes audio signals from an audio source 114 captured via a microphone 122. Audio source 114 may include any natural or manmade sounds (or, acoustic signals) and microphone 122 may include one or more microphones capable of capturing and converting the sounds into electronic signals.

In various implementations, processor 106 includes a de-noise system 110 that utilizes a remote machine learning (ML) model 112 to process audio signals and remove unwanted audio components (i.e., perform noise reduction). De-noise system 110 can be configured to provide various types of noise reduction using the remote ML model 112. For example, remote ML model 112 can be trained to recognize and classify different types of acoustic signatures in sounds such as environmental sounds, a user's voice, other speakers, etc. Based on a recognized sound (e.g., acoustic signature), de-noise system 120 can perform an associated de-noise operation, such as utilizing a particular type of dynamic processing (e.g., via one or more filters or digital signal processing techniques) to cancel undesirable environmental sounds, provide beam-forming, remove the user's voice, remove the voices of other speakers, etc. In some cases, ML model 112 is configured to compute a set of filter parameters using a neural network in response to inputted signal data. Details of an illustrative ML process are described with reference to FIG. 4.

In any case, once a de-noised signal 116 is generated by de-noise system 100, the de-noised signal 116 is transmitted to a communication system 118 on the wearable device 104. An audio processor 120 then outputs the de-noised signal 116 to an electrostatic transducer 124, which outputs de-noised audio for the user. Using this approach, much of the computational complexity and power requirements associated with running the remote ML model 112 are off-loaded to the accessory device 102, thus reducing the power consumption and computational resources of the wearable audio device 104. Additionally, by reducing the resources required by the wearable audio device 104, more flexibility is afforded to the design (i.e., form factor) of the wearable audio device 104. For instance, the wearable audio device 104 can be made smaller since fewer hardware components are required.

Figure 2:
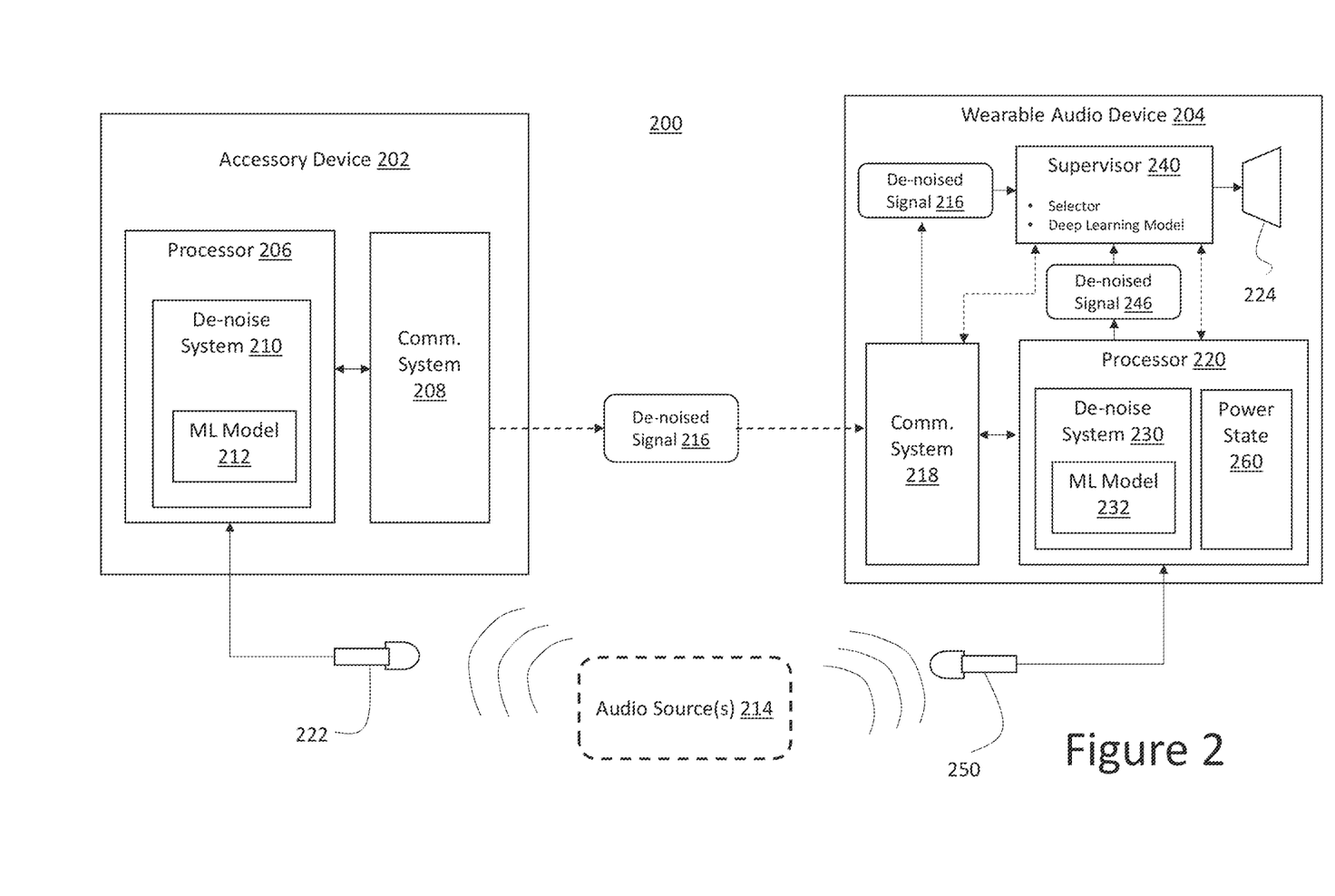
FIG. 2 depicts a block diagram of a further distributed machine learning-based system having a wearable audio device and an accessory device according to various implementations.

FIG. 2 depicts a further implementation of an illustrative distributed machine learning-based system 200 that includes an accessory device 202 and a wearable audio device 204. In illustrative implementations, accessory device 202 operates in a similar manner to the implementations of FIG. 1. Namely, accessory device 202 includes a processor 206 having a de-noise system 210 with a remote machine learning (ML) model 212. In response to capturing an audio signal from audio source (or sources) 214 via microphone 222, processor 206 generates a de-noised signal 216 that is transmitted to the wearable device 204 via communication system 208. Similar to the implementation of FIG. 1, de-noise system 210 can apply any ML based process to classify and reduce noise in the captured audio signal (e.g., apply ANR, apply beamforming, recognize and filter out a voice, etc.).

In the illustrative implementation of FIG. 2, wearable audio device 204 additionally includes a processor 220 having a de-noise system 230 with an onboard machine learning (ML) model 232. Further, wearable audio device 204 includes a microphone (or set of microphones) 250 configured to capture an audio signal from the audio source (or sources) 214. In response to the captured audio signal, de-noise system 230 generates a second de-noised signal 246. Accordingly, wearable audio device 204 is configured to receive a first de-noised signal 216 from the accessory device 202 (via communication system 218) and generate a second de-noised signal 246. In various implementations, de-noised signals 216, 246 are separately processed versions of the same audio source 214. In other implementations, de-noised signals 216, 246 originate from different or overlapping audio sources 214, e.g., a first audio source primarily includes environmental background sounds while a second audio source primarily includes a person's voice.

In certain implementations, remote ML model 212 and onboard ML model 232 are configured to process captured audio signals differently. For example, accessory device 202 (such as a smartphone) may include more computing and power resources than a wearable audio device 204 (such as earbuds). Accordingly, remote ML model 212 may be configured to perform a more computationally intensive process than onboard ML model 232. For example, remote ML model 212 may include a deep recurrent neural network such as a long short-term memory (LSTM) architecture to classify time-series audio data to learn multiple aspects of the user's environment, while onboard ML model 232 may be configured to perform more simple supervised learning, e.g., using Naïve Bayes classification to identify a user's voice. Furthermore, in various implementations, the remote ML model 212 can operate with a higher latency than the onboard ML model 232.

In certain implementations, the wearable audio device 204 includes a supervisor 240 to implement a supervisory process relating to the two de-noised signals 216, 246. For example, supervisor 240 can select which one of the two noise signals 216, 246 to output to transducer 224.

In particular cases, supervisor 240 selects the onboard generated de-noised signal 246 in response to determining that the wearable audio device 204 cannot communicate with the accessory device 202. In these instances, the supervisor 240 is configured to periodically check with the communication system 218 to determine if a connection is established with the accessory device 202, e.g., using a standard Bluetooth pairing and connection scheme.

In other cases, the supervisor 240 uses the remotely generated de-noised signal 216 in response to determining that the wearable audio device 204 is in a low power state. In these cases, the supervisor 240 checks the power state 260 of the wearable audio device 204, e.g., via processor 220 or a separate connection with a battery (not shown). In response to determining that the wearable audio device 204 is in a low power state, the supervisor 240 selects the remotely generated de-noised signal 216 for output to the transducer 224. Additionally, in response to determining that the wearable audio device 204 is in a low power state, either the supervisor 240 or the processor 220 can shut down the de-noise system 230 to conserve power.

In other cases, supervisor 240 is configured to evaluate both de-noised signals 216, 246 to determine which of those signals 216, 246 is of a higher quality. For instance, supervisor 240 can be configured to evaluate a speech modulation index. A greater modulation index can indicate cleaner speech since the presence of noise degrades the strength of modulation in a speech plus noise signal. In further implementations, both ML models 212, 232 are configured to produce a confidence value associated with their respective outputs. In this case, supervisor 240 selects that de-noise signal with the highest confidence value.

It is appreciated that while a few examples have been provided herein relating to the selection process by supervisor 240, any methodology can be utilized to make the selection. Further, while the supervisor 240 is shown embodied in the wearable audio device 204, supervisor could reside elsewhere, e.g., on the accessory device 202, on another device, in the cloud, etc.

In certain implementations, one or both devices 202, 204 can include an input control (not shown) to allow a user to select between the two de-noised signals 216, 246. For example, at least one of the accessory device 202 or wearable audio device 200 includes a hardware or software switch that manually controls selection of one of the two de-noised signals 216, 246.

In further implementations, supervisor 240 is configured to combine the two de-noised signals 216, 246 to output a single audio signal to the transducer 224. For example, the results can be combined using a deep learning model. In this case, a signal to noise (SNR) estimate, e.g., from the speech modulation index noted above, could result in a "best band" merge of the two signals. The merge could be a machine learning based process or just a simple band selected based on an SNR metric. In other cases, one of the de-noised signals may reduce one type of noise while the other reduces another type of noise. For example, a simpler (e.g., on-bud) de-noising system 230 may be utilized to remove tonal sounds near the ear while a more powerful de-noising system 210 may be utilized to remove complex babble noise. Depending on prevalence of noise types detected, one of the two or a combination of both may be utilized.

Figure 3:
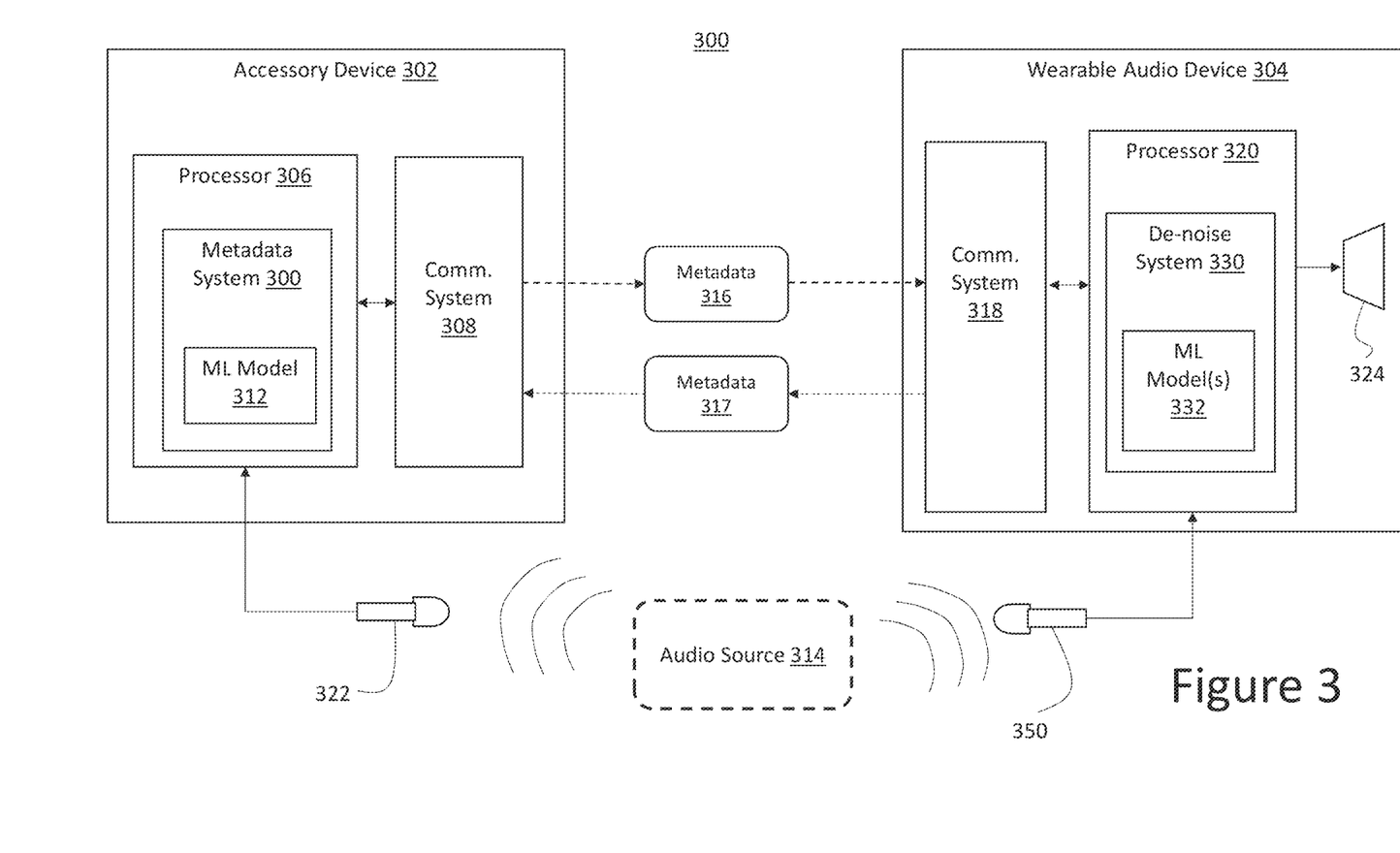
FIG. 3 depicts a block diagram of a still further distributed machine learning-based system having a wearable audio device and an accessory device according to various implementations.

FIG. 3 depicts a still further implementation of an illustrative distributed machine learning-based system 300 that includes an accessory device 302 and a wearable audio device 304. In illustrative implementations, accessory device 302 operates in a similar manner to the implementations of FIGS. 1 and 2, except that rather than generating a de-noised signal, processor 306 includes a metadata system 310 that utilizes a remote machine learning (ML) model 312 to generate metadata 316. In response to capturing an input signal from an audio source (or sources) 314 via microphone 322 (or via another type of sensor such as an accelerometer, optical sensor, thermometer, camera, etc.), processor 206 generates metadata 316 associated with the input signal. The metadata 316 is then transmitted to the wearable device 304 via communication system 308.

Metadata system 310 can apply any ML based process to classify a captured input signal into metadata 316. Illustrative metadata may include acoustic indicators or acoustic signatures about the ambient environment, including for example a characteristic of the environment (e.g., indoors versus outdoors, a social gathering, on a plane, in a quiet space, at an entertainment venue, in an auditorium, etc.), features of speech (e.g., the identity of the user, another person, a family member, etc., spectral energy, cepstral coefficients, etc.), features of noise (e.g., loud versus soft, high frequency versus low frequency, spectral energy, cepstral coefficients, etc.). Additionally, metadata 316 can include data accessible from another system at the accessory device 302, e.g., location data about where the audio signals are captured, a time at which the audio signals are captured, etc.

In the illustrative implementation of FIG. 3, wearable audio device 304 includes a processor 320 having a de-noise system 330 with an onboard ML model (or models) 332. Similar to the implementation of FIG. 2, wearable audio device 304 includes a microphone (or set of microphones) 350 configured to capture an audio signal from the audio source (or sources) 314. In various approaches, wearable audio device 304 processes the captured audio signal with de-noise system 330 using an ML model 332. In this implementation, de-noise system 330 utilizes the metadata 316 inputted via communication system 318 to process the audio signal and output a de-noised signal to transducer 324.

In some implementations, the metadata 316 is used to select an ML model from a set of ML models 332. For example, if the metadata 316 indicates that the user is in a social gathering with a room full of people, an ML model 332 may be selected that identifies friends and family of the user. De-noise system 330 can then filter out other noise not associated with the friends and family or amplify desired audio. In other implementations, the metadata 316 may be used to configure the onboard ML model 332 (e.g., set weights of nodes in a neural network) or specify filter parameters of the de-noise system 330. Metadata 316 could also act on non-ML processing, such as the selection of a beamformer appropriate for a current environment, making a wind noise canceling algorithm more aggressive if wind is detected, etc.

In certain implementations, metadata may be bi-directional to allow both devices 302, 304 to provide data to the other. For example, metadata 317 can be used to communicate information about the user's voice from processor 320 to processor 306, which would be difficult for processor 306 to ascertain since processor 320 is closer to the user. Metadata 317 could then be used by processor 306 to facilitate generation of metadata 316.

Figure 4:
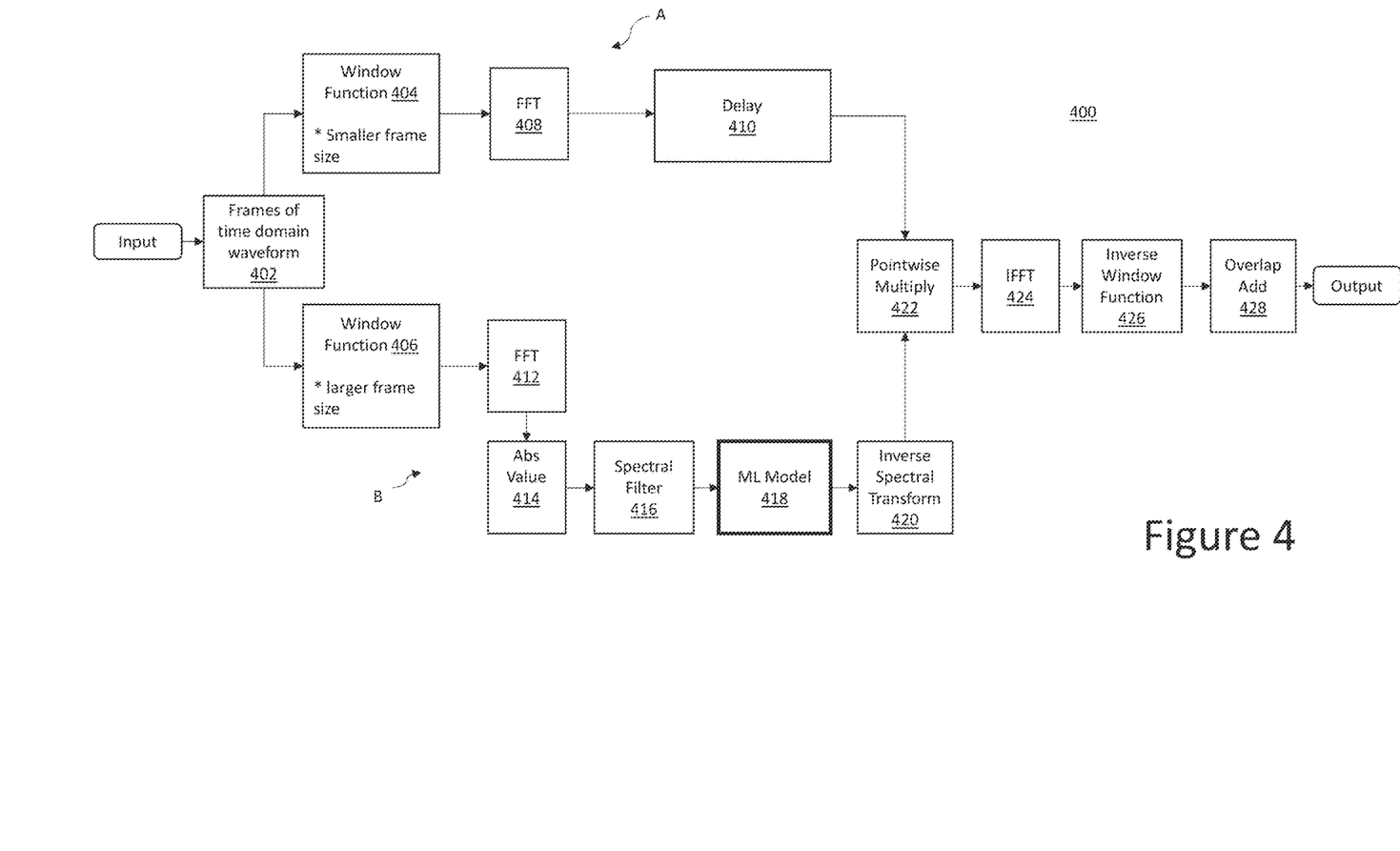
FIG. 4 depicts a flow diagram of a machine learning-based signal processing method according to various implementations.

FIG. 4 depict an illustrative de-noise system 400 that employs an ML model 418. In this example, an audio signal is presented as frames of a time domain waveform 402, and is processed along two paths, a first (top) path A that converts the audio signal from time domain to frequency domain using a fast Fourier transform (FFT) 408, and a second (bottom) path B that utilizes an ML model 418 to generate a mask (i.e., filter) that is applied to the signal at the end of the first path. The audio signal may, for example, originate from a mono input, a four-channel headphone array, or any other source.

Both paths A, B include a window function 404, 406 that receives the time domain wave form 402 and converts the data to a predefined frame size, e.g., using a Hann or Gaussian function. The first (i.e., top path) window function 404 generates a window size that is relatively larger than that generated by the second (i.e., bottom path) window function 406. For example, the top path window size may be on order of a 64/32 frame/hop size, while the bottom path window size may on the order of a 1024/32 frame/hop size suitable for use with a short time Fourier transform (STFT). Note that smaller frame sizes can be processed faster than the larger frame size. In this manner, the processing of the actual audio signal on the top path A is faster than the calculation of the mask on the bottom path B. This allows for robust filter computations to be performed along the less critical bottom path B without delaying the actual audio signal on the top path A.

In various implementations, the bottom path B likewise performs an FFT 412 and then takes an absolute value 414. This data is then processed by a spectral filter 416, which converts the data into for example a Mel spectrogram. This data is then processed by the ML model 418, which may, for example, include a deep neural network that outputs a latent spectral representation. This data is then processed by in inverse spectral transform 420 (such as an inverse Mel transform) to generate a real-valued spectral mask.

The spectral processing on the bottom path B allows the data to be processed using a short time Fourier transform (STFT). To sync with the delay caused by this processing, the top path A includes a delay 410 that allows the FFT signal data on the top path to be synched with the spectral mask data on the bottom path. The spectral mask is applied to the FFT signal data in a pointwise multiplication process 422. An inverse FFT 424 is then applied to the masked signal, followed by an inverse window function 426 and an overlap add process 428. The resulting de-noised signal is then output, for example at the transducer(s) on the wearable audio device (e.g., transducers 124, 224, 324, in FIGS. 1-3).

Figure 5:
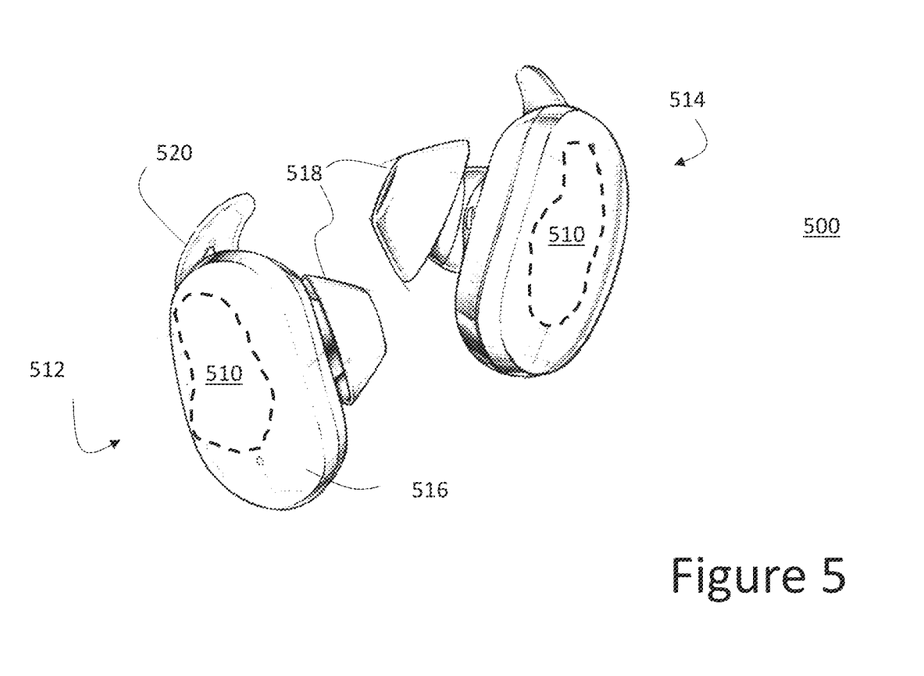
FIG. 5 depicts an illustrative wearable audio device according to various implementations.

FIG. 5 is a schematic depiction of an illustrative wearable audio device 500 that includes a de-noise system 510, such as those described herein. In this example, the wearable audio device 500 is an audio headset that includes two earphones (for example, in-ear headphones, also called "earbuds") 512, 514. While the earphones 512, 514 are shown in a "true" wireless configuration (i.e., without tethering between earphones), in additional implementations, the audio headset 500 includes a tethered wireless configuration (whereby the earphones 512, 514 are connected via wire with a wireless connection to a playback device) or a wired configuration (whereby at least one of the earphones 512, 514 has a wired connection to a playback device). Each earphone 512, 514 is shown including a body 516, which can include a casing formed of one or more plastics or composite materials. The body 516 can include a nozzle 518 for insertion into a user's ear canal entrance and a support member 520 for retaining the nozzle 518 in a resting position within the user's ear. Each earphone 512, 514 includes a de-noise system 510 for implementing some or all of the various de-noise functions described herein. Other wearable device forms could likewise be implemented, including around-the-ear headphones, over-the-ear headphones, audio eyeglasses, open-ear audio devices etc.

As described herein, various implementations include systems configured to distribute de-noise processing between wearable audio devices and connected accessory devices. Distributed processing allows computational resources to be located in an optimal manner to effectively manage power consumption, cost, form factors, etc.

It is understood that one or more of the functions of the described distributed machine learning-based systems may be implemented as hardware and/or software, and the various components may include communications pathways that connect components by any conventional means (e.g., hard-wired and/or wireless connection). For example, one or more non-volatile devices (e.g., centralized or distributed devices such as flash memory device(s)) can store and/or execute programs, algorithms and/or parameters for one or more described devices. Additionally, the functionality described herein, or portions thereof, and its various modifications (hereinafter "the functions") can be implemented, at least in part, via a computer program product, e.g., a computer program tangibly embodied in an information carrier, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions. All or part of the functions can be implemented as, special purpose logic circuitry, e.g., an FPGA (field programmable gate array) and/or an ASIC (application-specific integrated circuit). Processors suitable for the execution of a computer program include, by way of example, both general and special purpose microprocessors, and any one or more processors of any kind of digital computer. Generally, a processor may receive instructions and data from a read-only memory or a random access memory or both. Components of a computer include a processor for executing instructions and one or more memory devices for storing instructions and data.

It is noted that while the implementations described herein utilize microphone systems to collect input signals, it is understood that any type of sensor can be utilized separately or in addition to a microphone system to collect input signals, e.g., accelerometers, thermometers, optical sensors, cameras, etc.

Additionally, actions associated with implementing all or part of the functions described herein can be performed by one or more networked computing devices. Networked computing devices can be connected over a network, e.g., one or more wired and/or wireless networks such as a local area network (LAN), wide area network (WAN), personal area network (PAN), Internet-connected devices and/or networks and/or a cloud-based computing (e.g., cloud-based servers).

In various implementations, electronic components described as being "coupled" can be linked via conventional hard-wired and/or wireless means such that these electronic components can communicate data with one another. Additionally, sub-components within a given component can be considered to be linked via conventional pathways, which may not necessarily be illustrated.

A number of implementations have been described. Nevertheless, it will be understood that additional modifications may be made without departing from the scope of the inventive concepts described herein, and, accordingly, other implementations are within the scope of the following claims.

We claim:

1. A system for processing audio signals, comprising:
 a wearable audio device comprising a transducer and a communication system; and
 an accessory device configured to wirelessly communicate with the wearable audio device, the accessory device comprising a processor configured to process a source audio signal according to a method that comprises:
source separating the source audio signal; and
providing a source separated audio signal to the wearable audio device for transduction;
wherein source separating the source audio signal comprises:
converting the source audio signal into a first sequence of frequency transformed frames, each having a first frame size;
converting the source audio signal into a second sequence of frequency transformed frames, each having a second frame size greater than the first frame size;
applying a machine learning model to the second sequence of frequency transformed frames to create a spectral mask;
applying the spectral mask to the first sequence of frequency transformed frames to generate a de-noised sequence of frequency transformed frames of the first frame size; and
converting the de-noised sequence of frequency transformed frames to a de-noised time domain signal,
wherein providing the source separated audio signal to the wearable audio device comprises wirelessly transmitting the de-noised time domain signal to the wearable audio device.

2. The system of claim 1, wherein converting the source audio signal into the first sequence of frequency transformed frames comprises applying a window function to the source audio signal to generate frames of the first frame size and then applying a fast Fourier transform (FFT) to the frames.

3. The system of claim 1, wherein converting the source audio signal into the second sequence of frequency transformed frames comprises applying a window function to the source audio signal to generate frames of the second frame size and then applying a fast Fourier transform (FFT) to the frames.

4. The system of claim 3, wherein converting the source audio signal into the second sequence of frequency transformed frames further comprises:
taking an absolute value of data in each frame after the FFT is applied; and
applying a spectral transform to the absolute value of the data in each frame.

5. The system of claim 4, wherein creating the spectral mask further comprises performing an inverse spectral transform after the machine learning model is applied.

6. The system of claim 1, wherein applying the spectral mask to the first sequence of frequency transformed frames comprises performing a pointwise multiply operation, and wherein converting the source separated sequence of frequency transformed frames to the source separated time domain signal comprises:
performing an inverse FFT on an output of the pointwise multiply operation; and
performing an inverse window function on an output of the inverse FFT.

7. A system for processing audio signals, comprising:
a wearable audio device comprising a first microphone, a communication system, a transducer and a first processor, wherein the first processor comprises an onboard machine learning model configured to process a source audio signal captured by the first microphone and generate a first source separated audio signal;
an accessory device configured to wirelessly communicate with the wearable audio device, wherein the accessory device comprises a second microphone, a second processor having a remote machine learning model configured to process the source audio signal captured by the second microphone and generate a second source separated audio signal; and
a processor and memory adapted to implement a supervisory process, the supervisory process configured to selectively output the first source separated audio signal or the second source separated audio signal to the transducer, wherein selecting the output is based on at least one of a power state of each device, a wireless connection between devices, a signal quality, a confidence value, or a user input.

8. The system of claim 7, wherein the remote machine learning model operates with a higher latency than the onboard machine learning model.

9. The system of claim 7, wherein the supervisory process utilizes the first source separated audio signal in response to a determination that the wearable audio device cannot communicate with the accessory device.

10. The system of claim 7, wherein the supervisory process utilizes the second source separated audio signal in response to a determination that the wearable audio device has a low battery condition.

11. The system of claim 7, wherein the signal quality comprises a speech quality.

12. The system of claim 7, further comprising a second supervisory process that combines the remote machine learning model and the onboard machine learning model to form an ensemble model, wherein an output of the remote machine learning model is passed as input to the onboard machine learning model.

13. The system of claim 7, wherein at least one of the onboard machine learning model and remote machine learning model performs beamforming.

* * * * *